(12) United States Patent
Okada et al.

(10) Patent No.: US 7,197,211 B2
(45) Date of Patent: *Mar. 27, 2007

(54) VARIABLE WAVELENGTH DISPERSION COMPENSATOR

(75) Inventors: Hideo Okada, Kawasaki (JP); Shinichi Wakana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/949,378

(22) Filed: Sep. 27, 2004

(65) Prior Publication Data

US 2005/0041921 A1 Feb. 24, 2005

Related U.S. Application Data

(63) Continuation of application No. 09/986,293, filed on Nov. 8, 2001, now Pat. No. 6,832,020.

(30) Foreign Application Priority Data

Jul. 17, 2001 (JP) .............................. 2001-216415

(51) Int. Cl.
*G02B 6/26* (2006.01)

(52) U.S. Cl. .......................................... 385/39; 385/15

(58) Field of Classification Search .................. 385/15, 385/39

See application file for complete search history.

(56) References Cited

U.S. PATENT DOCUMENTS

| 5,969,866 | A | 10/1999 | Shirasaki |
| 6,002,661 | A | 12/1999 | Abe et al. |
| 6,028,706 | A | 2/2000 | Shirasaki et al. |
| 6,263,127 | B1 * | 7/2001 | Dragone et al. ............... 385/24 |
| 6,343,866 | B1 | 2/2002 | Cao et al. |
| 6,498,803 | B2 * | 12/2002 | Heist et al. .................... 372/99 |
| 6,556,320 | B1 * | 4/2003 | Cao ............................. 398/65 |
| 6,836,580 | B2 * | 12/2004 | Izumi et al. .................. 385/15 |

FOREIGN PATENT DOCUMENTS

JP        5-136509        6/1993

(Continued)

OTHER PUBLICATIONS

"Spindler & Hoyer, Piezo Control", Opto Science, Inc., U2-U4 and U6.

(Continued)

*Primary Examiner*—Jennifer Doan
(74) *Attorney, Agent, or Firm*—Staas & Halsey LLP

(57) ABSTRACT

Beams inputted from a fiber are collected by a lens and are angular-dispersed by a VIPA. The luminous flux from the VIPA is collected on a surface-shape variable mirror by a lens. The surface-shape variable mirror is configured in such a way that a mirror shape can be controlled by a piezo stage and necessary wavelength dispersion can be applied, if necessary. Although the beam group reflected on the surface-shape variable mirror propagates the light path backward, the beam group is inputted to a position different from the outputted position when the beam group enters the VIPA. Therefore, a desired wavelength dispersion can be given to each beam group by performing control of the input position in the VIPA for each wavelength using the surface-shape variable mirror.

20 Claims, 14 Drawing Sheets

FOREIGN PATENT DOCUMENTS

| | | |
|---|---|---|
| JP | 8-193805 | 7/1996 |
| WO | WO 92/15903 | 9/1992 |
| WO | WO 99/09448 | 2/1999 |

OTHER PUBLICATIONS

"Basic Designs of Piezoelectric Positioning Elements", Physik Instrumente, 4,39.

Wada Yukihiko, Patent Abstracts of Japan, Piezoelectric Element Array, Variable-Shape Mirror and Assembly Thereof, Compensating Optical Device, and Astronomical Telescope, Publication No. 07066463, Publication Date: Mar. 10, 1995.

Nishioka Kimihiko, Patent Abstracts of Japan, Eccentric Optical System, Publication No. 20002-98237, Publication Date: Oct. 24, 2000.

A. Chellabi et al., "Active Shape Control of a Deformable Mirror in an Adaptive Optic System", Communications, Computers and Signal Processing, 1997. 10 Years PACRIM 1987-1997—Networking the Pacific Rim. 1997 IEEE Pacific Rim Conference on Victoria, BC, Canada Aug. 20-22, 1997, New York, NY, USA, IEEE, US, Aug. 20, 1997, pp. 581-584.

U.S. Appl. No. 09/986,293, filed Nov. 8, 2001, Hideo Okada et al., Fujitsu Limited.

* cited by examiner

VARIABLE WAVELENGTH DISPERSION COMPENSATOR

CROSS-REFERENCE TO RELATED APPLICATIONS

This application is a continuation application of application Ser. No. 09/986,293, filed Nov. 8, 2001, and now U.S. Pat. No. 6,832,020.

This application is based upon and claims the priority of Japanese application no. 2001-216415, filed Jul. 17, 2001, and U.S. patent application Ser. No. 09/986,293, filed Nov. 8, 2001, now U.S. Pat. No. 6,832,020 the contents being incorporated herein by reference.

BACKGROUND OF THE INVENTION

1. Field of the Invention

The present invention relates to a variable wavelength dispersion compensator for variably compensating wavelength dispersion in an optical fiber communications system.

2. Description of the Related Art

An optical fiber communications system generally has a problem that the distortion of a transmission waveform due to optical fiber wavelength dispersion (chromatic dispersion) degrades signal quality. Therefore, the wavelength dispersion must be compensated.

For a dispersion compensation method, a method for restoring waveform distortion by inserting a device having a dispersion characteristic the opposite of an optical fiber (dispersion compensation fiber) in a transmission line is used. Furthermore, variable dispersion compensators have been developed which incorporate a chromatic dispersion generation device (VIPA—"virtually imaged phased array") and a light-returning device (non-spherical mirror) in order to cope with the change of the dispersion characteristic due to the temperature, the pressure and the like of an optical fiber (Japanese Patent Applications 10-534450 and 11-513133).

FIG. 1 shows the basic configuration of a variable dispersion compensator using a VIPA.

Beams inputted from a fiber 10 are collected in a form of a line or dots by a lens 11 and are inputted to a VIPA 12. The VIPA is a transparent parallel plate on both sides of which a reflection film is formed. Although one reflection film has a reflectance of 100%, the other has a reflectance of less than 100%, and typically of 95%. Therefore, beams inputted to the VIPA 12 are repeatedly reflected between these reflection films and some of the beams are repeatedly outputted to the outside at one time from a surface with a low reflectance. Since the beams are outputted to the outside at each reflection, the beams have phase differences between each other. Therefore, if the beams interfere with each other, beams with a prescribed wavelength are formed into luminous flux that propagates in a prescribed direction. Thus, the VIPA 12 is a device for generating a plurality of pieces of luminous flux that propagates in different directions depending on the wavelengths.

The outputted beams are collected at a lens 13 and are reflected on a non-spherical mirror 14. In this case, as shown by dotted lines in FIG. 1, if attention is focused on one beam of the luminous flux, by reflecting a specific beam on the non-spherical mirror and by changing the input position after return from the output position from the VIPA when returning the beam to the VIPA 12, the distance between the lens 11 and fiber 10 that the beam propagates can be changed. Specifically, the propagation distance can be extended, and propagation delay can be applied to the beam. If a plurality of beams with different wavelengths take different routes, the respective propagation delay of the beams can be changed by a wavelength, and wavelength dispersion can be generated, accordingly. If the wavelength dispersion of an optical fiber is compensated, a reciprocal dispersion having a reverse characteristic of canceling the wavelength dispersion of the beam is applied to the beam.

This compensator has a characteristic of freely changing a compensation amount by moving the non-spherical mirror depending on a dispersion value. The non-spherical mirror has a gradation structure, such as a concave surface and a convex surface.

FIG. 2 shows a non-spherical mirror.

This non-spherical mirror is located on a moving stage. If the mirror is moved in the direction of an arrow shown in FIG. 2, the shape of the light input position of the mirror changes. Therefore, a plurality of different chromatic dispersions (wavelength dispersions) can be generated.

FIG. 3 shows the wavelength dispersion and signal degradation of a transmission line, and the compensation.

For example, as shown in FIG. 3, if an input pulse (1) is transmitted from a transmitter and is received by a receiver through an optical fiber, the pulse width of an output pulse (2) is expanded by wavelength dispersion and the pulse is distorted. In this case, if a variable dispersion compensator (hereinafter a VIPA, for example) is inserted and reciprocal dispersion is given to the output pulse (2), the distortion of the pulse can be compensated. Therefore, the receiver can receive a pulse without distortion (3).

FIG. 4 shows dispersion to be compensated by a VIPA.

If the wavelength of a pulse and the dispersion of an output pulse (3) are assumed to be $\lambda 0$ and 100 ps/nm, respectively, the relationship between the wavelength and dispersion becomes as shown in FIG. 4. In this case, dispersion compensation by a VIPA means the total dispersion amount is reduced to 0 ps/nm. Thus, a post-compensation pulse of 0 ps/nm is generated. Thus, the VIPA reduces the total dispersion amount to zero by shifting the dispersion amount that a beam suffers from the propagation through the optical fiber upward or downward (reciprocal dispersion).

<Problem No. 1>

According to the conventional method described above, the stage must be moved depending on a dispersion compensation amount. Therefore, if the compensation range is extended, the non-spherical mirror must be made longer and a movement amount also increases. However, since the increase in a stage movement amount greatly affects the accuracy of the stage movement, dispersion cannot be accurately compensated, which is a problem.

Once a non-spherical mirror is designed, the mirror can compensate for only a specific band. Therefore, in order to compensate for a new band, a new non-spherical mirror must be designed.

<Problem No. 2>

Although the conventional method gives a pulse with reciprocal dispersion, a case where this method is applied to a WDM beam is studied.

FIG. 5 shows a case where the conventional wavelength dispersion method is applied to a WDM beam.

In this case, it is assumed that there are three waves ($\lambda 1 < \lambda 0 < \lambda 2$). As shown in FIG. 5, $\lambda 1$, $\lambda 0$, and $\lambda 2$ take different dispersion values depending on the wavelengths, that is, a dispersion slope in an optical fiber (curve 1). In this case, if the dispersion is shifted so that the dispersion value of $\lambda 0$ becomes zero in a VIPA, as shown in FIG. 4, the dispersion values of λ1 and λ2 do not become zero. Since the VIPA shifts the curve by a specific dispersion amount throughout the entire wavelength, the VIPA simply shifts curve 1 upward or downward. Therefore, it is impossible to simultaneously reduce all the dispersion values of λ1, λ0 and λ2 to zero, which is also a problem.

SUMMARY OF THE INVENTION

It is an object of the present invention to provide a variable wavelength dispersion compensator for also compensating for a wavelength dispersion slope.

The variable wavelength dispersion compensator of the present invention comprises an angular dispersion unit giving angular dispersion to an input beam and a surface-shape variable mirror returning the angle-dispersed beam to the angular dispersion unit, the surface shape of which can be changed. The compensator gives desired wavelength dispersion to a beam by reflecting a beam inputted from the angular dispersion unit on the surface-shape variable mirror unit, inputting the reflected beam to the angular dispersion unit again, and outputting the beam from the angular dispersion unit.

According to the present invention, since a surface-shape variable mirror, the surface shape of which can be changed, is used, differently from the conventional method, the mirror shape can be changed for each wavelength, wavelength dispersion can be appropriately compensated and a wavelength dispersion slope can also be appropriately compensated.

The variable wavelength dispersion compensator of the present invention can cope with a change in the wavelength dispersion characteristic of an optical fiber due to deterioration caused by aging, a change in a wavelength dispersion amount to be compensated due to the extension of a transmission line and the like, by changing the surface shape of the mirror of the compensator without replacing the compensator itself.

DESCRIPTION OF THE PREFERRED EMBODIMENTS

Figure 6:
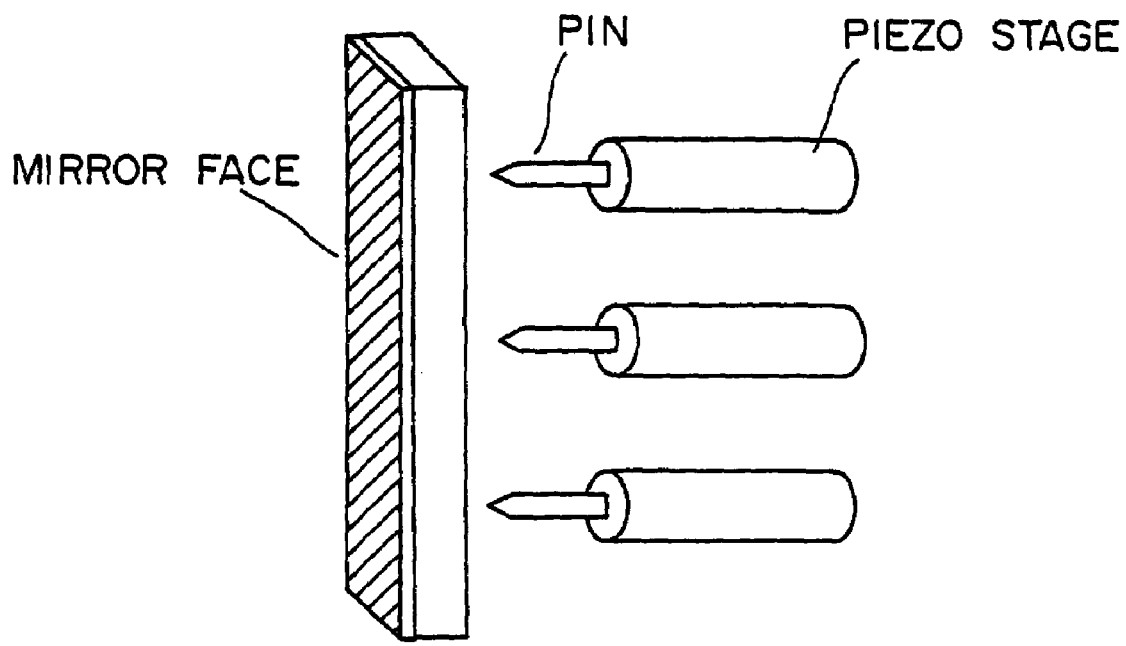
FIG. 6 shows the basic configuration of the preferred embodiment of the present invention.

FIG. 6 shows the basic configuration of the preferred embodiment of the present invention.

In this preferred embodiment, a wavelength dispersion compensator using a VIPA uses a mirror, the surface shape of which can be changed, as a non-spherical mirror.

The surface-shape variable mirror shown in FIG. 6 comprises a thin mirror, piezo stages and pins. The pin is attached to the tip of the piezo stage, and this pin and the mirror face are joined.

Figure 7B:
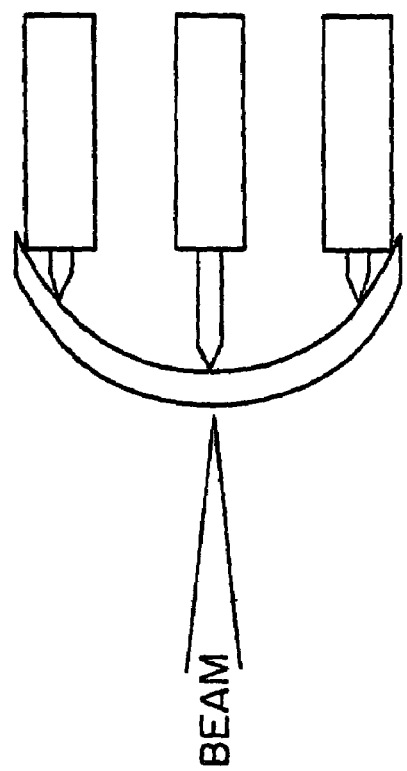
FIGS. 7A and 7B show the operation of the surface-shape variable mirror of the preferred embodiment.
Figure 7A:
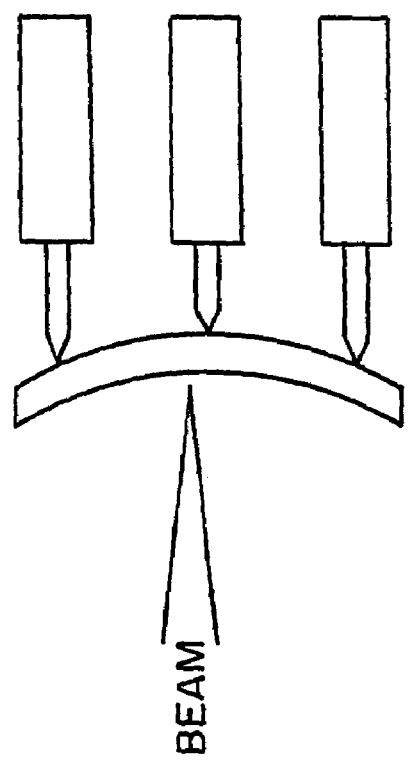

FIGS. 7A and 7B show the operation of the surface-shape variable mirror of this preferred embodiment.

Figure 1:
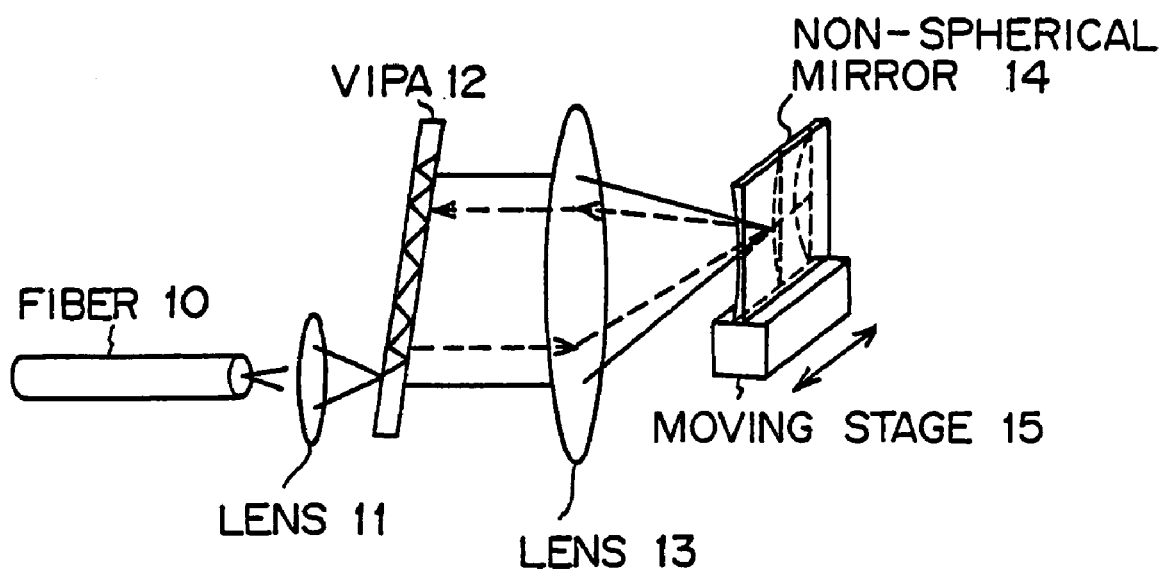
FIG. 1 shows the basic configuration of a variable dispersion compensator using a VIPA.
Figure 2:
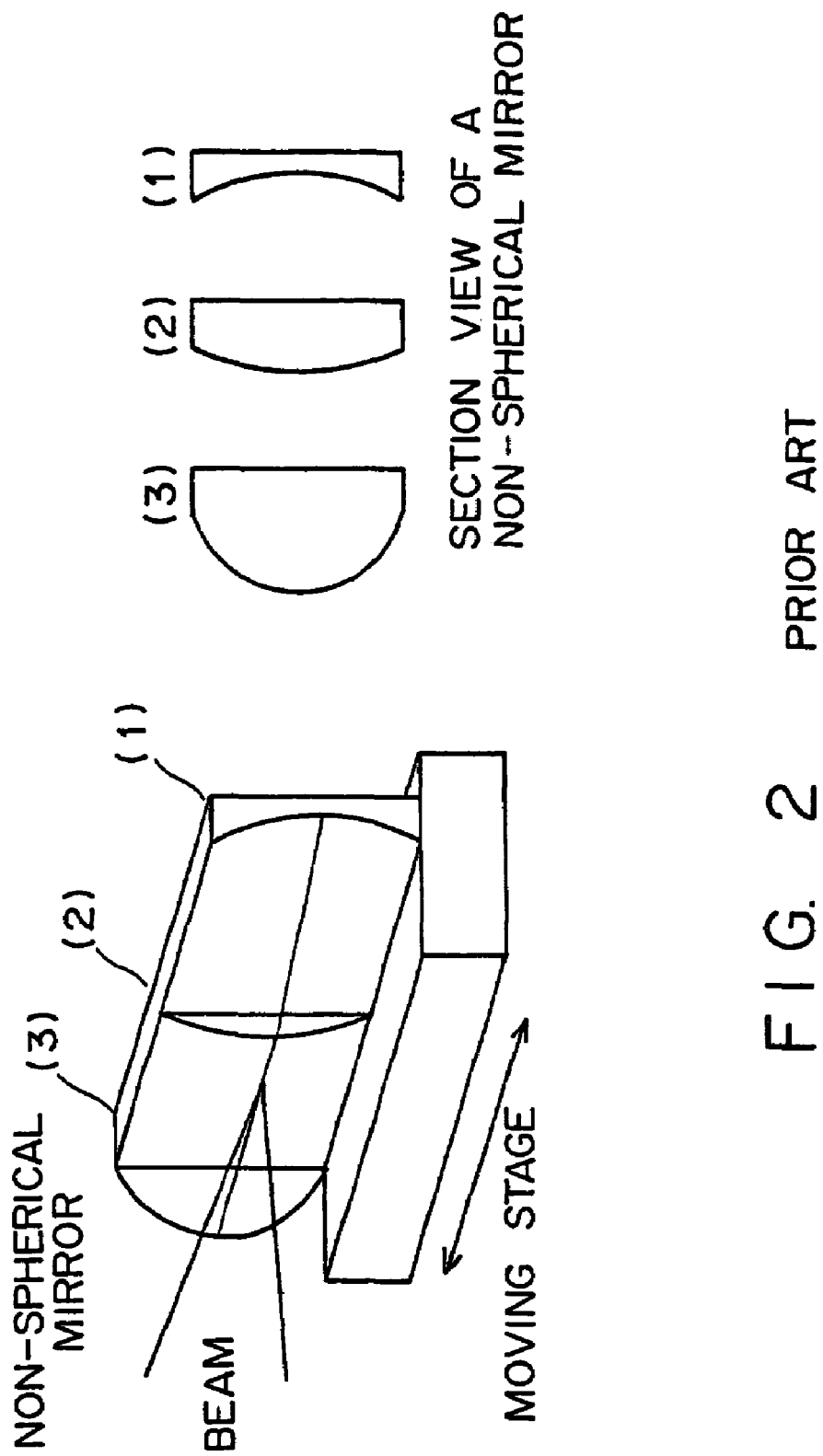
FIG. 2 shows a non-spherical mirror.
Figure 3:
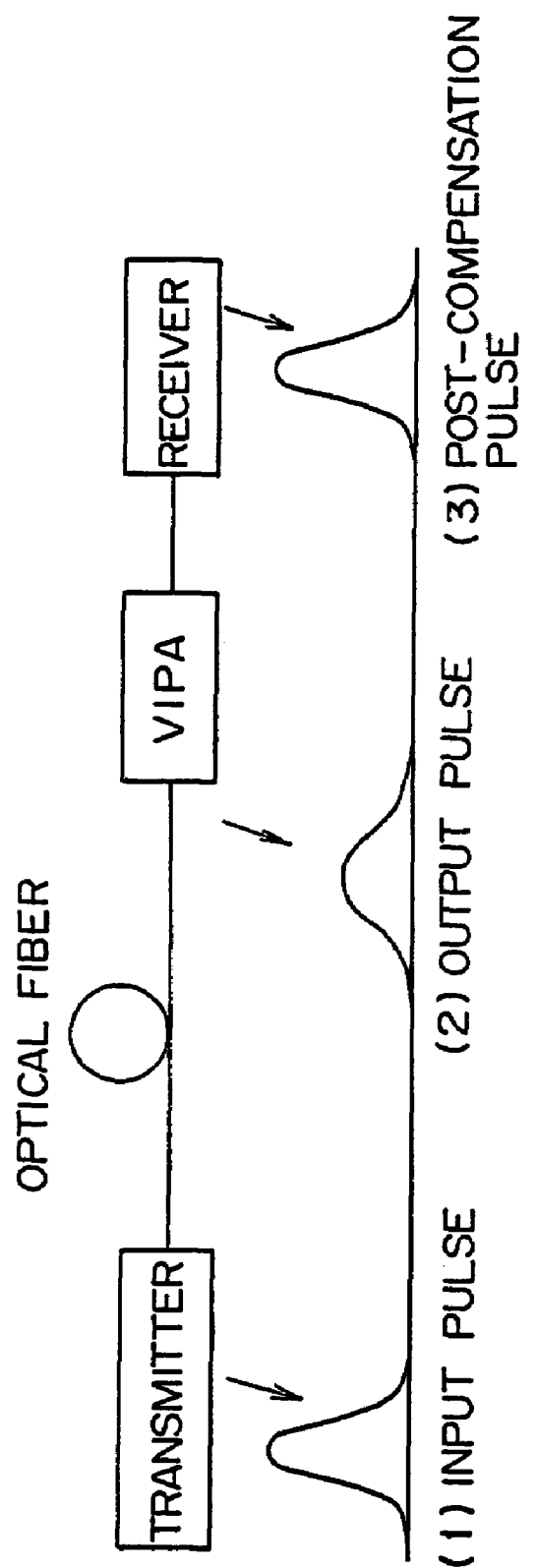
FIG. 3 shows the wavelength dispersion and signal degradation of a transmission line and the compensation.
Figure 4:
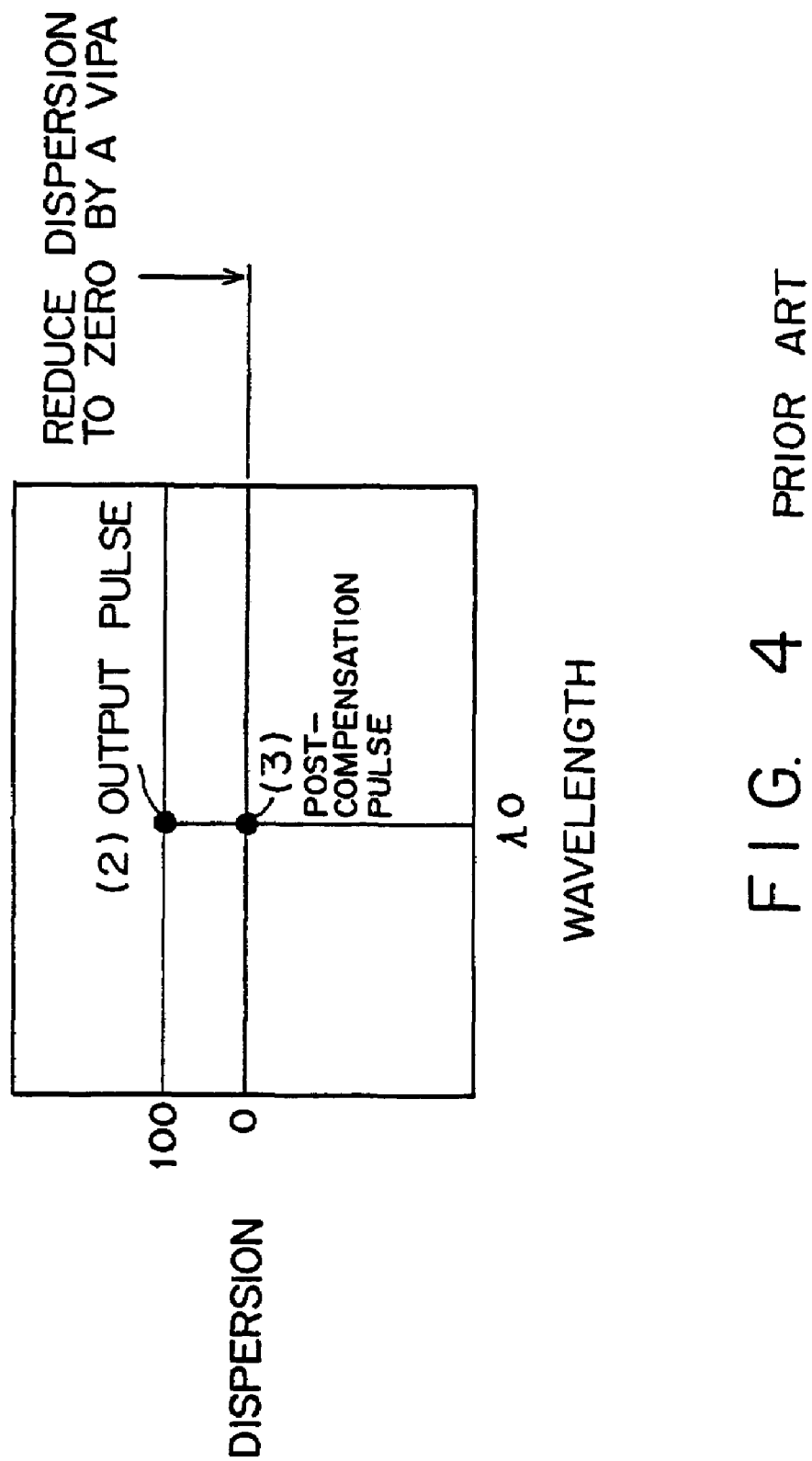
FIG. 4 shows dispersion to be compensated by a VIPA.
Figure 5:
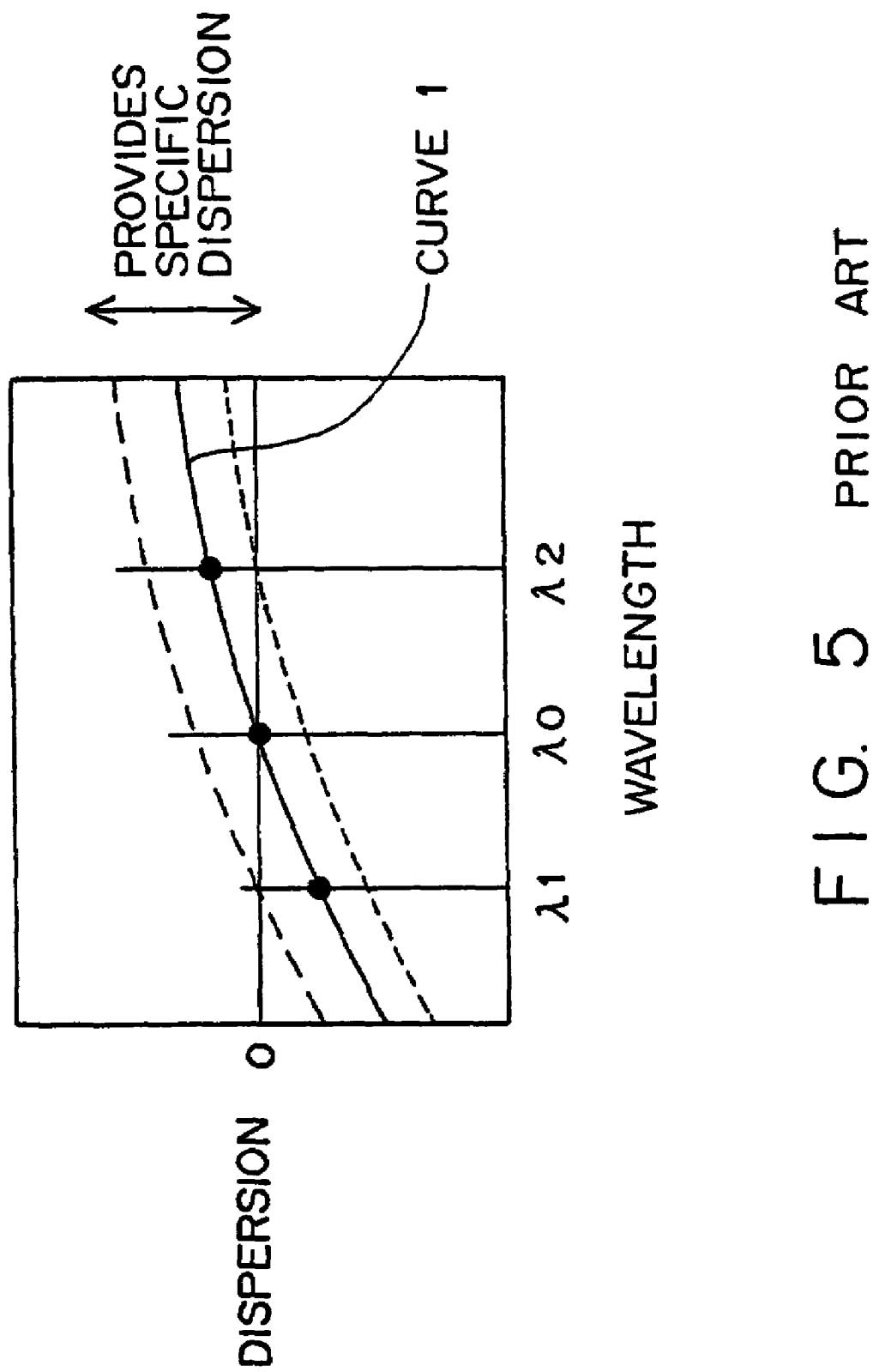
FIG. 5 shows a case where the conventional wavelength dispersion method is applied to a WDM beam.

Since the piezo stage is expandable, for example, if only the middle stage is squeezed, as shown in FIG. 7A, a concave mirror face can be formed. This corresponds to the section (1) of the non-spherical mirror shown in FIG. 2. If the upper and lower stages are squeezed and the middle stage is expanded, the section shown in FIG. 7B is obtained. This corresponds to the section (3) shown in FIG. 2.

Specifically, the surface-shape variable mirror comprises one mirror and a plurality of piezo stages. By expanding/squeezing the plurality of piezo stages, a variety of mirror shapes can be formed. Therefore, there is no need to prepare all necessary shapes in advance, unlike a non-spherical mirror, and only one mirror can produce any desired shape.

Since the piezo stage can be controlled in units of several nanometers, a fine surface shape can be produced.

Although in this preferred embodiment, a thin mirror is used, for example, the mirror can be produced by evaporating gold onto a thin glass plate yielding a thickness of approximately 100 μm. Basically, it is sufficient if both the glass plate and the evaporated gold have sufficient thickness to not break when the piezo stage is expanded/squeezed and if the surface is a mirror.

Problem No. 1 can be solved by using the surface-shape variable mirror described above. Specifically, even if a compensation band is expanded, it is sufficient to change a mirror shape by appropriately collecting beams on a lens and changing the movement amount of the piezo stage. Therefore, there is no problem of accuracy degradation accompanying both an increase of mirror length and an increase of a stage movement amount. Even if a compensation range is modified, there is no need to prepare a new mirror and the problem can be easily solved by transforming a mirror surface shape.

Problem No. 2 can be solved as follows. By separating WDM beams for each wavelength using a diffraction grid and the like, applying this mirror for each wavelength and optimally compensating for dispersion for each wavelength, the dispersion of each wavelength can be reduced to zero.

Figure 8:
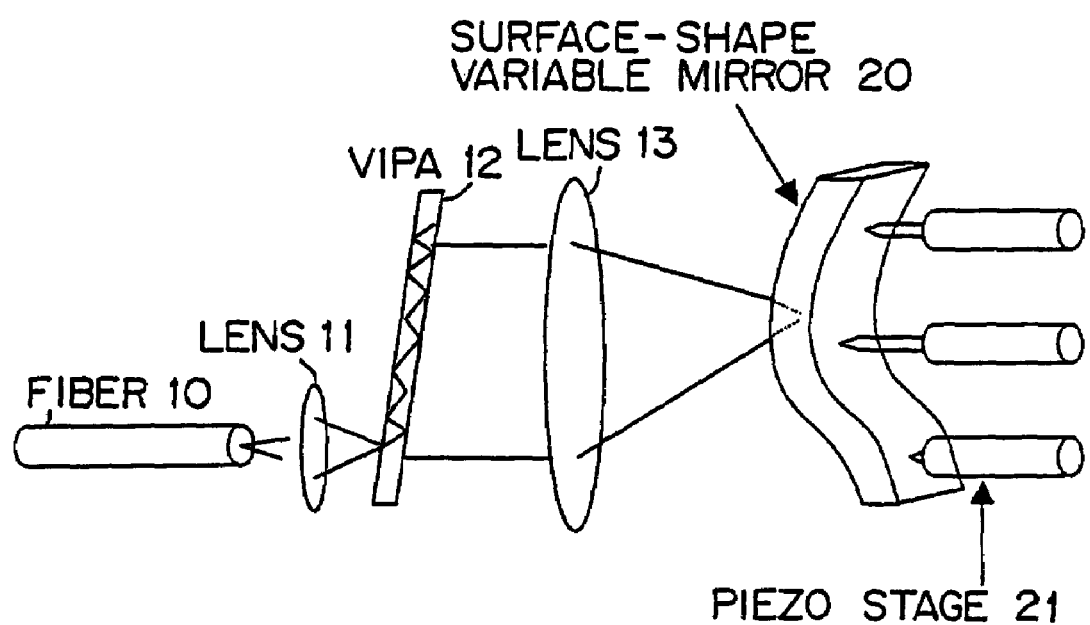
FIG. 8 shows the configuration of the first preferred embodiment of the present invention.

FIG. 8 shows the configuration of the first preferred embodiment of the present invention.

The first preferred embodiment can be implemented by replacing the non-spherical mirror and moving stage with a surface-shape variable mirror.

Beams inputted from a fiber 10 are collected at a VIPA 12 by a lens 11 and are outputted as a plurality of pieces of different flux for each wavelength. The outputted beams are collected at a surface-shape variable mirror 20 by a lens 13. A piezo stage 21 is provided at the back of the surface-shape variable mirror 20, and the mirror face of the surface-shape variable mirror 20 can be transformed into an arbitrary shape. Prescribed wavelength dispersion can be generated by calculating wavelength dispersion to be generated by the VIPA 12 and determining the shape of the mirror face so as to generate desired dispersion.

Figure 9:
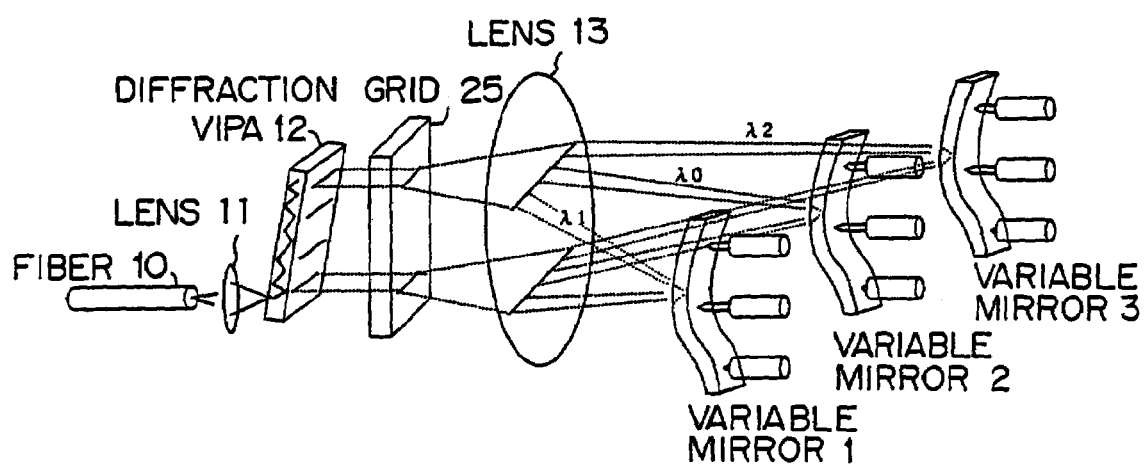
FIG. 9 shows the configuration of the second preferred embodiment of the present invention.

FIG. 9 shows the configuration of the second preferred embodiment.

In this preferred embodiment, the output beams from the VIPA 12 are branched for each wavelength using a diffraction grid, and the branched beams are collected at a plurality of surface-shape variable mirrors (variable mirrors 1–3). Beams can be branched into, for example, three groups of $\lambda 1$, $\lambda 0$, and $\lambda 2$ ($\lambda 1 < \lambda 0 < \lambda 2$) shown in FIG. 9 for each wavelength by using a diffraction grid. Although in this preferred embodiment, a diffraction grid 25 is used to branch beams for each wavelength, anything that causes the dispersion of a wavelength, such as a prism, can be used.

Each group of beams with a different wavelength is collected at a different point through a lens. In FIG. 9, $\lambda 1$, $\lambda 0$, and $\lambda 2$ are collected at a surface-shape variable mirror 1 (variable mirror 1), a surface-shape variable mirror 2 (variable mirror 2), and a surface-shape variable mirror 3 (variable mirror 3), respectively.

The surface-shape variable mirrors 1–3 (variable mirrors 1–3) can produce different surface shapes. Therefore, a different dispersion value can be given to each of $\lambda 1$, $\lambda 0$, and $\lambda 2$.

Figure 10:
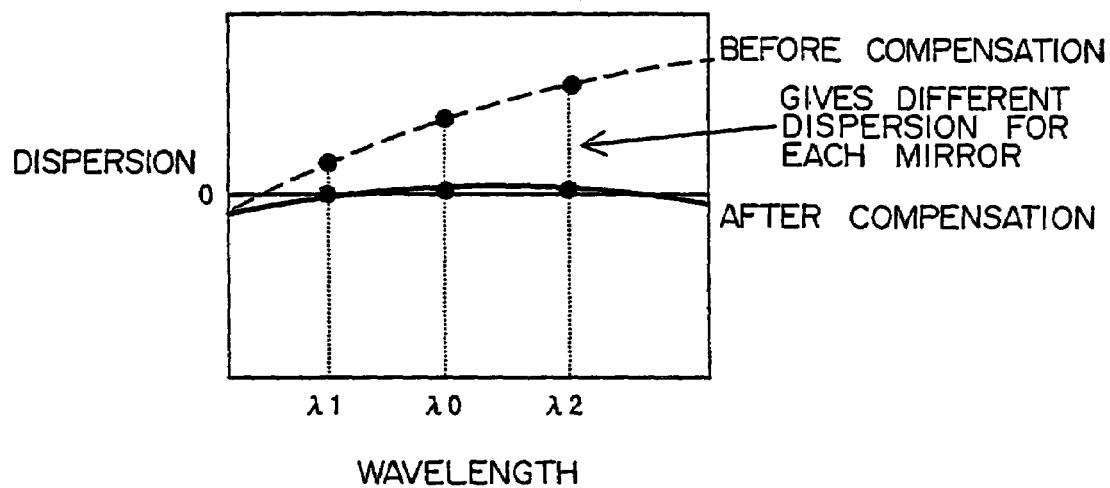
FIG. 10 shows the effects of the configuration shown in FIG. 9.

FIG. 10 shows the effects of the configuration shown in FIG. 9. Specifically, as shown in FIG. 10, if a different dispersion is given for each wavelength using the surface-shape variable mirror of this preferred embodiment when dispersion before compensation is as shown by the broken line, after compensation, all dispersion values can be reduced to zero, as shown by the solid line. Therefore, the dispersion slope of a WDM beam can also be compensated.

Although in FIG. 10, a plurality of surface-shape variable mirrors are located separately and in parallel, there is no need to separate the plurality of mirrors. For example, a piezo stage can also be two-dimensionally located against one large mirror.

Figure 11:
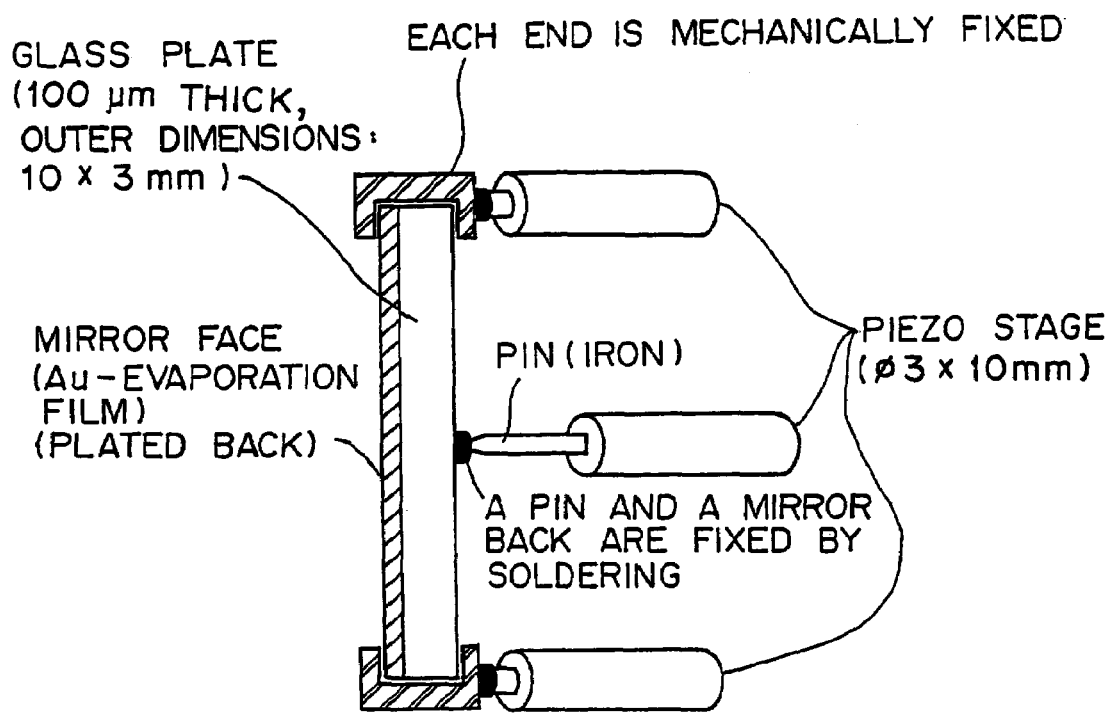
FIG. 11 shows the detailed structure of a variable mirror (No. 1)
Figure 12:
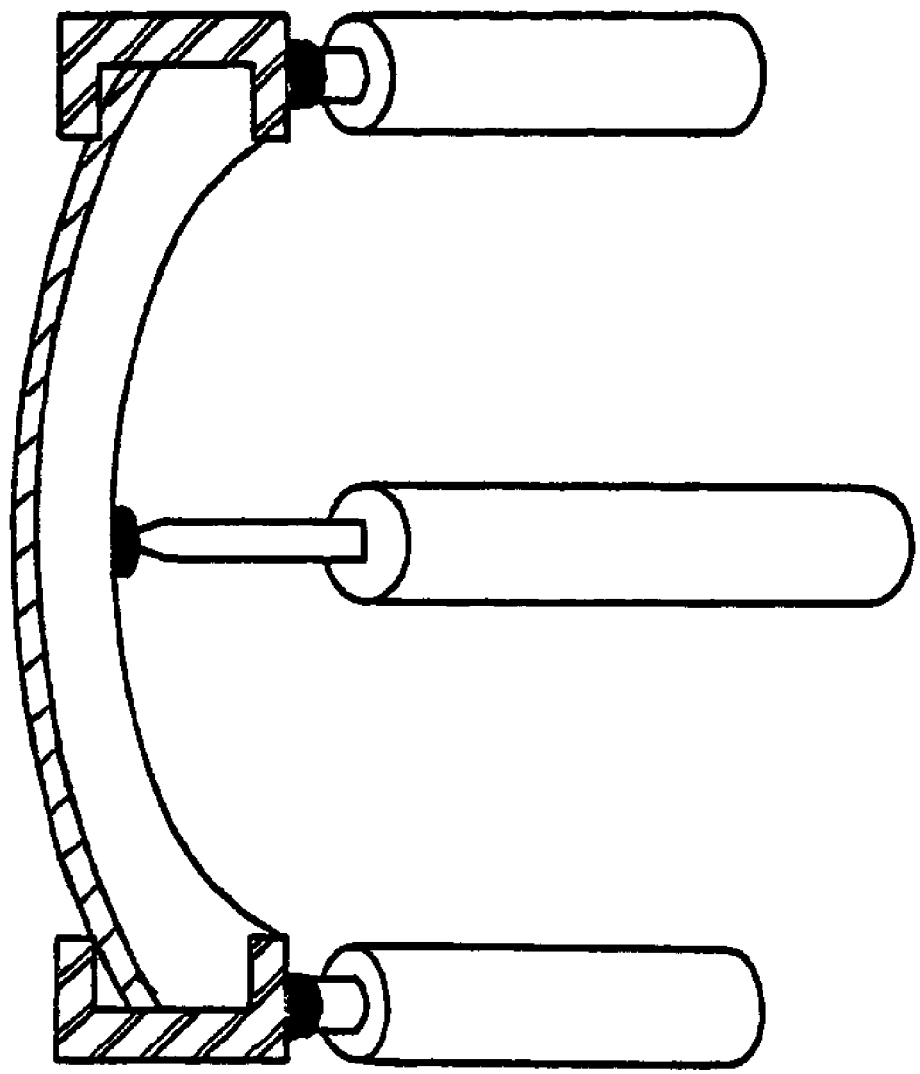
FIG. 12 shows the detailed structure of a variable mirror (No. 2)

FIGS. 11 and 12 show the detailed structure of such a variable mirror.

For such a variable mirror, for example, a glass plate (silica system glass) having both the thickness of 100 μm and the outer dimensions of 10×3 mm is used. FIGS. 11 and 12 show the longer side section of the glass plate. A glass plate having some hardness, the elasticity of which can be changed, and which cannot be broken is used. Each end of the mirror is mechanically fixed. This joint and the piezo are fixed by soldering and the like. The pin and the back of the mirror are also fixed by soldering and the like. It is assumed that the mirror is used in a state where there is a small displacement amount and there is no plasticity transformation in the solder layer, and in realty the mirror is used in a state where the solder will not be broken off.

Although in FIG. 11, the position of the middle piezo stage is different from those of the upper and lower piezo stages, the mirror is designed so that both the pin and solder can be easily seen. The middle piezo stage is located in such a way that the distance between the variable mirror and middle piezo stage becomes the same as both the distance between the variable mirror and upper piezo stage and the distance between the variable mirror and lower piezo stage. Furthermore, although in FIG. 11, one middle piezo stage is provided, in reality, two or more middle piezo stages can also be provided. By providing many piezo stages, a mirror face with a more complex shape can be produced.

On the mirror face of the glass plate, gold and the like is plated. The thickness of the plating is thin enough to be sufficient for the elasticity to change as the glass plate is transformed and is thick enough to be sufficient for the plating to be prevented from tearing off as the elasticity of the glass plate changes. The supporting table of the piezo stages, which is not shown in FIG. 11, is not especially limited if the piezo stages can be properly fixed at a prescribed position.

As shown in FIG. 12, the piezo stage has one shaft. In FIG. 11, the piezo stage moves in the vertical direction against the mirror face (horizontal direction against a paper surface). For example, if the pin of the middle piezo stage is expanded, as shown in FIG. 12, a convex mirror face can be formed. Conversely, if the pin of the middle piezo stage is squeezed, a concave mirror face is formed.

Although in FIGS. 11 and 12, only one middle piezo stage is provided, if two or more piezo stages are provided and alternately expanded/squeezed, a wavy mirror face can also be formed. In this way, by providing two or more piezo stages, a more complex mirror face can be formed.

Figure 13:
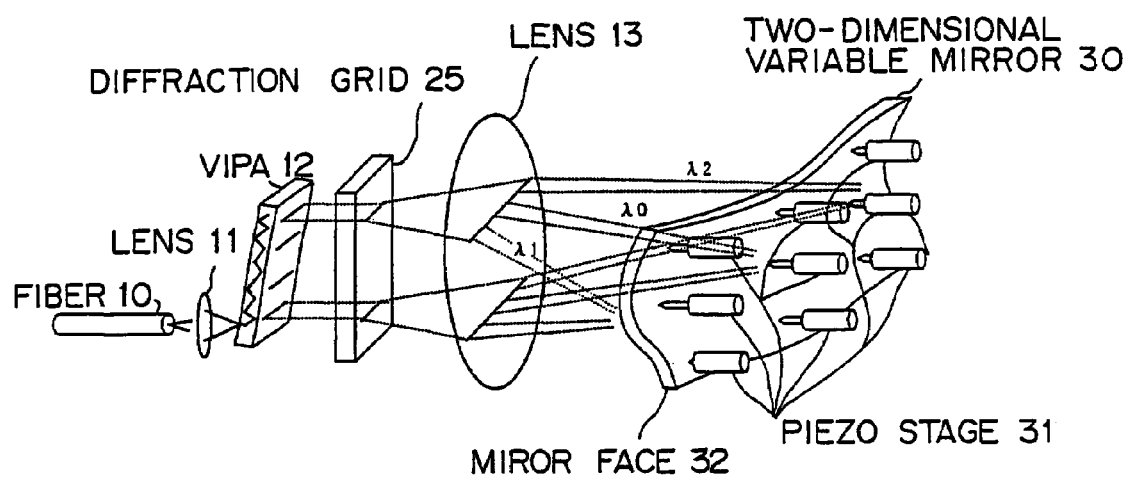
FIG. 13 shows the configuration of the third preferred embodiment of the present invention.

FIG. 13 shows the configuration of the third preferred embodiment of the present invention.

In the preferred embodiment shown in FIG. 9, a plurality of separate variable mirrors are provided to compensate for wavelength dispersion with a plurality of wavelengths and to eliminate the influence of a dispersion slope from beams. In this preferred embodiment, a two-dimensional variable mirror 30 obtained by incorporating these mirrors is used instead of the plurality of separate variable mirrors.

Beams inputted to a fiber 10 are branched for each wavelength by a diffraction grid 25 after passing through both a lens 11 and a VIPA 12 and after being angular-dispersed. In this example, the beams are branched into three groups of beams with wavelengths $\lambda 1$, $\lambda 0$ and $\lambda 2$. In the two-dimensional variable mirror 30, piezo stages 31 are two-dimensionally located and a mirror face 32 can be transformed more complexly. Thus, the mirror face 32 are continuously transformed up to a position where beams with wavelength $\lambda 0$ hit the mirror face and the position where beams with wavelength $\lambda 0$ hit the mirror face has a shape suited for appropriately compensating for the dispersion of beams with wavelength $\lambda 0$. Similarly, the mirror face 32 are continuously transformed up to a position where beams with wavelength $\lambda 2$ hit the mirror face and the position where beams with wavelength $\lambda 2$ hit the mirror face has a shape suited for appropriately compensating for the dispersion of beams with wavelength $\lambda 2$.

The number of piezo stages 31 is increased and a more complex mirror face can thus be formed. Then, one mirror face can compensate for a plurality of beam groups with a plurality of wavelengths.

Figure 14:
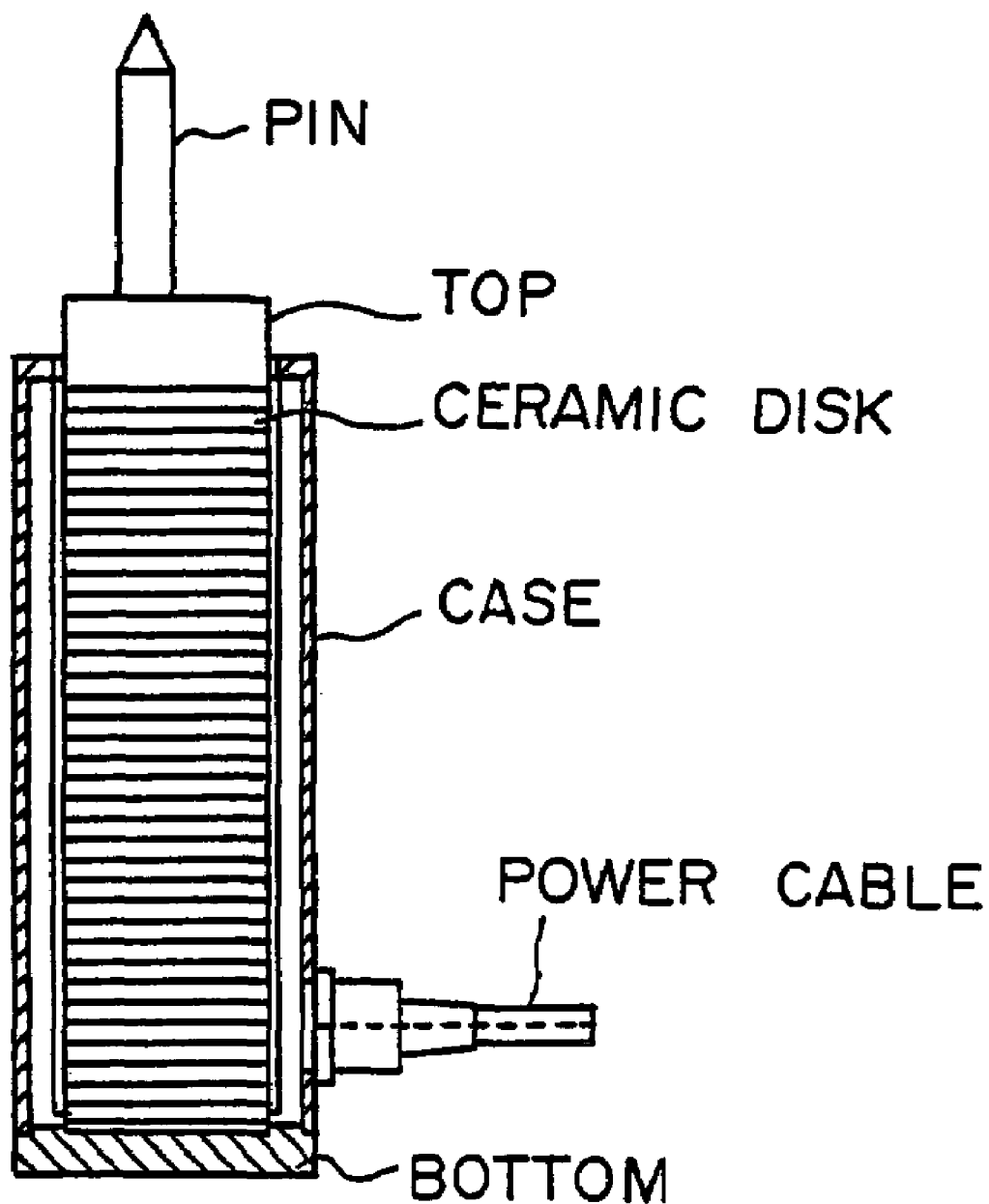
FIG. 14 shows the structure of a piezo stage.

FIG. 14 shows the structure of a piezo stage.

The piezo stage comprises a piezo stack having a pin at the tip. The piezo stack is cased. The piezo stack has a structure where a plurality of ceramic disks are piled sandwiching electrodes. If a voltage is applied to the electrode, the ceramic disks expand/contract. Then, the expansion/contraction of the ceramic disks moves the pin attached at the tip of the piezo stack. A power cable is connected to the case that encloses a piezo stack, and voltage can be applied to the electrode, accordingly.

Although in the description of this preferred embodiment, a VIPA is described as one example of a device for angular-dispersing inputted beams, according to the present invention, the device is not limited to a VIPA. The combination of a transmission type diffraction grid and a reflection type diffraction grid can also be used to perform a function equivalent to a VIPA. Similarly, the surface-shape variable mirror is not limited to the combination of a glass plate and piezo stages, which a person having an ordinary skill in the art can easily understand.

By adopting the surface-shape variable mirror of the present invention described above, a variety of mirror face shapes can be formed. Therefore, the problems, such as the degradation of compensation accuracy and the reproduction of a mirror, can be solved.

Furthermore, dispersion slope compensation can also be implemented, which was impossible by the conventional method.

Even if a dispersion compensation amount to be compensated changes when a new optical fiber is laid, a wiring extension installation is carried out or a repeater is incorporated, and the dispersion compensator of the present invention can cope with such a situation only by modifying the mirror face, and there is no need for another dispersion compensator. Even if a dispersion compensation amount to be compensated changes due to the deterioration caused by aging of an optical fiber and the like, similarly the situation can be coped with only by transforming the mirror face.

What is claimed is:

1. An apparatus comprising:
    an angular dispersion unit angular dispersing input beams;
    a mirror unit positioned to return the angular dispersed beams to the angular dispersion unit via reflection of the angular dispersed beams off a surface region of the mirror unit, wherein the surface region has a deformable surface shape; and
    a control unit deforming the surface shape of the surface region of the positioned mirror unit to compensate for dispersion of the input beams.

2. The apparatus according to claim 1, wherein the control unit is provided at a back of the mirror unit.

3. The apparatus according to claim 2, wherein the control unit deforms the surface shape of the surface region of the mirror unit by transforming the surface shape into an arbitrary shape to generate a dispersion based on a wavelength dispersion generated by the angular dispersion unit and the surface shape of the surface region.

4. The apparatus according to claim 1, wherein the control unit comprises a shaft moving in a vertical direction against a back of the mirror unit.

5. An apparatus comprising:
    an angular dispersion unit angular dispersing input beams;
    a branching unit branching the angular dispersed beams into beam groups with different wavelengths;
    mirror units positioned to return the beam groups to the angular dispersion unit via reflections of the beam groups off surface regions of the mirror units, wherein the surface regions have deformable surface shapes; and
    a control unit deforming the surface shapes of the surface regions of the positioned mirror units.

6. The apparatus according to claim 5, wherein the control unit deforms the surface shapes so that wavelength dispersion is compensated for each branched beam group.

7. The apparatus according to claim 5, wherein the control unit deforms the surface shapes by transforming the surface shapes into arbitrary shapes to generate dispersion based on a wavelength dispersion generated by the angular dispersion unit and the surface shapes.

8. The apparatus according to claim 5, wherein said branching unit is a diffraction grid or a chromatic dispersion generation device.

9. An apparatus comprising:
    an angular dispersion unit angular dispersing input beams;
    a two-dimensional mirror unit positioned to return the angular dispersed beams to the angular dispersion unit; and
    control units two-dimensionally located with respect to the two-dimensional mirror unit deforming a surface shape of the positioned two-dimensional mirror unit in two-dimensional directions within a surface region of the two-dimensional mirror unit to compensate for dispersion of the input beams.

10. The apparatus according to claim 9, further comprising:
    a branching unit branching the angular dispersed beams into beam groups with different wavelengths.

11. The apparatus according to claim 10, wherein the surface shape of the two-dimensional mirror unit deforms in two-dimensional directions so that each branched beam group is received on a part of the surface and a prescribed wavelength dispersion is given to the branched beam group.

12. The apparatus according to claim 9, wherein said branching unit is a diffraction grid or a chromatic dispersion generation device.

13. The apparatus according to claim 1, wherein the angular dispersion unit is a virtually imaged phased array (VIPA).

14. The apparatus according to claim 5, wherein the angular dispersion unit is a virtually imaged phased array (VIPA).

15. The apparatus according to claim 9, wherein the angular dispersion unit is a virtually imaged phased array (VIPA).

16. An apparatus comprising:
    an angular dispersion unit receiving light and angular dispersing the received light;
    a mirror having a mirror surface with a variable surface shape off of which the angular dispersed light is reflected so that the reflected light returns to the angular dispersion unit, to thereby provide dispersion to the light received by the angular dispersion unit; and
    a controller varying the surface shape of the mirror surface to change an amount of the provided dispersion, to thereby compensate for dispersion of the light received by the angular dispersion unit.

17. An apparatus as in claim 16, wherein the angular dispersion unit is a virtually imaged phased array (VIPA) which angularly disperses the received light in accordance with a wavelength of the received light.

18. An apparatus comprising:
    an angular dispersion unit receiving light and angular dispersing the received light;
    a mirror having a mirror surface with a variable surface shape off of which the angular dispersed light is reflected so that the reflected light returns to the angular dispersion unit, to thereby provide dispersion to the light received by the angular dispersion unit; and
    means for varying the surface shape of the mirror surface to change an amount of the provided dispersion, to thereby compensate for dispersion of the light received by the angular dispersion unit.

19. An apparatus as in claim 18, wherein the angular dispersion unit is a virtually imaged phased array (VIPA) which angularly disperses the received light in accordance with a wavelength of the received light.

20. An apparatus comprising:
    an angular dispersion unit receiving light and angular dispersing the received light;
    a mirror having a mirror surface with a variable surface shape and positioned so that the angular dispersed light is reflected off the mirror surface and then returns to the angular dispersion unit, to thereby provide dispersion to the light received by the angular dispersion unit; and a controller varying the surface shape of the mirror surface of the positioned mirror to change an amount of the provided dispersion, to thereby compensate for dispersion of the light received by the angular dispersion unit.

* * * * *